United States Patent [19]

Fagerburg et al.

[11] 3,882,090

[45] May 6, 1975

[54] WATER-SOLUBLE POLYAMIDES FROM ALKYLENEOXY BIS(PROPYL-AMINE)

[75] Inventors: David R. Fagerburg; Burns Davis; Charles J. Kibler, all of Kingsport, Tenn.

[73] Assignee: Eastman Kodak Company, Rochester, N.Y.

[22] Filed: Mar. 20, 1974

[21] Appl. No.: 452,889

Related U.S. Application Data

[63] Continuation-in-part of Ser. No. 367,039, June 4, 1973, abandoned.

[52] U.S. Cl. .......... 260/78 R; 57/140 R; 117/161 P; 161/229; 260/18 N; 260/29.2 N; 260/33.4 P
[51] Int. Cl. .............................. C08g 20/20
[58] Field of Search ................................ 260/78 R

[56] References Cited
UNITED STATES PATENTS 3,454,534 7/1969 Crovall........................... 260/78 R
3,499,853 3/1970 Griebsch et al................... 260/78 R
3,509,106 4/1970 Lotz et al.......................... 260/78 R
3,556,927 1/1971 Sommer et al.................... 260/78 R

*Primary Examiner*—Harold D. Anderson
*Attorney, Agent, or Firm*—Elliott Stern; Daniel B. Reece, III

[57] ABSTRACT

This invention relates to novel linear water-soluble polyamides having ether linkages in the polymer chain which are comprised of components A, B and C as follows: (A) an aliphatic dicarboxylic acid selected from adipic acid, pimelic acid, suberic acid and combinations thereof, (B) a modifying amount of up to 25 mole percent of a nine carbon aliphatic dicarboxylic acid or up to 15 mole percent of 1,12-dodecanedioic acid, and (C) an aliphatic diamine having the formula $H_2N-C_3H_6-(OR)-_n-O-C_3H_6NH_2$ wherein R is ethylene, 1,2-propylene or 1,3-propylene and n is an integer of 2 to about 13. These polyamides are useful as textile sizing agents, coatings, and adhesives.

8 Claims, No Drawings

WATER-SOLUBLE POLYAMIDES FROM ALKYLENEOXY BIS(PROPYL-AMINE)

This is a continuation-in-part application of U.S. Ser. No. 367,039, filed June 4, 1973 now abandoned.

This invention relates to sizing compositions and to fibrous articles sized therewith. In one of its more specific aspects, this invention relates to hot-melt sizing compositions for textile yarns made from linear polyesters. In another aspect of this invention the polyamides disclosed herein have particular utility in the paper-using industry as a hot-melt adhesive which will dissolve in aqueous or caustic aqueous solutions, thereby providing a method whereby scrap paper which usually results in paper operations can be recovered by repulping and adding this pulp back in the paper-making process.

When textile materials are to be used in the form of multifilament yarns for the fabrication of textile material, it is desirable before the weaving process to treat the warp yarn with a sizing composition (sometimes referred to as an "agent") which binds the several filaments together. This treatment strengthens the several filaments and renders them more resistant to abrasion during the subsequent weaving operations. It is especially important that the sizing composition imparts abrasion resistance to the yarns during weaving because abrasion tends to sever the yarn and to produce end breaks which lower the quality of the final woven product. It is also important that the sizing composition be one which can be subsequently removed from the yarn by scouring.

Various high-molecular weight materials have been suggested as sizing agents for yarns. Among such materials are gelatin, sodium polyacrylate, polyvinyl alcohol, and the sodium salt of a 50/50 maleic anhydride-styrene copolymer. U.S. Pat. No. 3,546,008 describes fibrous articles which are sized with sizing compositions comprising linear, water-dissipatible polyesters derived from at least one dicarboxylic acid component, at least one diol component, at least 20 mole percent of said diol component being a poly(ethylene glycol) and a difunctional monomer containing a —$SO_3M$ group attached to the aromatic nucleus, wherein M is hydrogen or a metal ion. These sizing materials are easily adhered to textile materials from a water-dissipation wherein the compositions thereof are dispersed or dissipated in water and the fiber is drawn through the dissipation, woven and then removed from the woven fabric with scouring. While these sizes are useful for their intended purpose, they have a drawback in that they must be put on the fiber from the water-dissipation. An advantage of the polyamides of this invention is that they may be applied to the fibers directly from the melt and are easily removed at the end of the finishing operation by dissolution in water. The prior sizes cannot be advantageously applied as a hot-melt in that their higher melt viscosities render them unsuitable for this method of application.

It is an object of this invention, therefore, to provide hot-melt sizing compositions and fibrous particles sized therewith. Another object of this invention is to provide sizing compositions for textile yarns, especially those yarns made from linear polyesters. Still another object of this invention is to provide hot-melt adhesive compositions which are advantageously utilized for various sealing or fastening operations in making paper bags or in book binding. Still another object of this invention is to provide hot-melt sizing compositions which will impart abrasion resistance to textile yarns during weaving. Yet another object of this invention is to provide hot-melt sizing compositions which can be removed from textile yarns by scouring. Other objects of this invention will appear as the description of the invention proceeds.

These and other objects are obtained through the practice of this invention, one embodiment of which comprises providing a water-soluble polyamide of components A, B and C as follows:

A. a dicarboxylic acid selected from adipic acid, pimelic acid, suberic acid or combinations thereof;

B. a modifying amount of (1) up to 25 mole percent of a 9 carbon atom aliphatic dicarboxylic acid, or (2) up to 15 mole percent of 1,12-dodecanedioic acid, said mole percents being based upon the total amount of dicarboxylic acid; and C. an aliphatic diamine at least 95 mole percent of which is at least one (alkyleneoxy)bis(propylamine) having the formula $H_2N-C_3H_6-(OR)_n-O-C_3H_6-NH_2$ wherein R is ethylene, 1,2-propylene or 1,3-propylene and n is an integer of 2 to about 13, said polyamide having an inherent viscosity of from 0.15 to about 1.0 as measured at 25°C. at a concentration of 0.5 grams of said polyamide per 100 ml. of a solvent consisting of 60% by weight phenol and 40% by weight tetrachloroethane, said polyamide having a ratio of alkyleneoxy to amide linkages in the range of from at least about 3:2 to about 14:2.

Other embodiments of this invention through which the above objects are obtained comprise a process for sizing a fibrous article, said process comprising applying to said fibrous article a sizing composition as described above in the form of its hot-melt.

It has been discovered that the above-described linear water-soluble polyamides are effective as sizes when applied from a hot-melt to a variety of natural and synthetic textile yarns. Examples of such yarns include those made from polyesters such as poly(ethylene terephthalate) and poly(1,4-cyclohexylene dimethylene terephthalate), cotton, rayon, cellulose acetate, nylon, and polypropylene or blends of these fibers, etc. Therefore, although this invention will be illustrated by reference to polyester fibers, the sizing compositions of this invention may be used on these other types of textile materials.

It is necessary for greater effectiveness that a textile size be substantially scoured or removed from the woven fabric so that it will not interfere with subsequent finishing and dyeing operations. In practical terms this means that the sizing composition must be water-soluble. The polyamides of this invention contain an alkyleneoxy moiety which is hydrophilic and has a ratio of alkyleneoxy to amide linkages in the range from at least 3:2 to about 13:2. In a preferred embodiment of this invention, the ratio of alkyleneoxy to amide linkages is in the range of from at least about 3:2 to about 5:2. For example, a preferred sizing composition is prepared from adipic acid and 3,3'-(diethylenetrioxy)-bis(propylamine). This particular composition has a ratio of alkyleneoxy to amide linkages of about 3:2 and an inherent viscosity in the range of from 0.15 to about 1.0. In an especially preferred embodiment of this invention, the inherent viscosity of the polyamide is from about 0.25 to about 0.65 and the melt temperatures of these polymers are found to be in the range of 70°–130°C. The sizes of this invention meet the requirements for an effective size, i.e., the size compositions (1) adhere the fiber bundle being sized, (2) form a sufficiently protective film so that the fiber is protected during weaving, and (3) are removable from the fiber under ordinary conditions of scouring.

The polyester yarns to be sized are the highly-polymeric fiber and film-forming, linear polyesters derived from at least one aliphatic, cycloaliphatic or aromatic dicarboxylic acid and at least one aliphatic, cycloaliphatic or aromatic diol. The preparation of these polyesters and the spinning of fibers therefrom are well-known procedures and need not be detailed herein.

The aliphatic dicarboxylic acid components from which the linear water-soluble polyamide hot-melt sizing compositions of this invention are prepared are adipic acid, pimelic acid, and suberic acid or combinations thereof. Additionally, it has been found that the incorporation of certain specific amounts of particular aliphatic dicarboxylic acids into the polyamides of this invention are useful in improving some of the desirable properties of the polyamides. For example, it has been found that the incorporation into the polymer of up to 25 mole percent (preferably from 1 to about 15 mole percent) of a nine carbon atom aliphatic dicarboxylic acid such as azelaic acid or 4,4-dimethylpimelic acid or up to 15 mole percent (preferably 1 to about 12 mole percent) of 1,12-dodecanedioic acid is especially advantageous in improving the elongation of the resultant film formed on a yarn that has been sized with the polyamides of this invention. The above-mentioned mole percentages are based on a total mole percent of dicarboxylic acid of 100 mole percent.

The aliphatic diamine, at least 95% mole percent of which is at least one (alkyleneoxy)bis(propylamine) having the formula: $H_2N—C_3H_6—(OR)_n—O—C_3H_6—NH_2$ wherein R is ethylene, 1,2-propylene or 1,3-propylene and $n$ is an integer of 2 to about 13, is useful as the diamine component of the polyamide of this invention. Examples of suitable diamine components of this invention are 3,3'-(diethylenetrioxy)bis(propylamine), 3,3'-(tetraethylenepentaoxy)bis(propylamine), 3,3'-(pentaethylenehexaoxy)bis(propylamine), 3,3'-(triethylenetetraoxy)bis(propylamine), etc. Generally only the diamines derived from cyanoethylated diethylene glycol and higher ethyleneoxy glycols such as tri-, tetra-, penta-ethylene glycols or higher polyethylene glycols, etc., are useful. A method of preparing these glycols is more fully illustrated in an article by N. Nazaroz, G. A. Shvekhgeimer and V. A. Rudenko, Institute of Organic Chemistry of the Academy of Sciences of the U.S.S.R., June 28, 1953. It has been found that the diamines from cyanoethylated water and ethylene glycol both give water-insoluble polyamides with the aliphatic diacids mentioned. Use of large percentages of azelaic or oxalic acids yields materials that, although non-tacky, are water-insoluble. Copolyamides may, of course, be made using diamines that either do or do not contain ether oxygens, the limit of modification being determined by the melting point and water solubility of their products. The major requirement being the ratio of alkyleneoxy to amide linkages in the final polyamide must be from about 3:2 to about 14:2. Examples of other diamines which may be used in amounts of up to 5 mole percent based on 100 mole percent of diamine are hexamethylene diamine, 1,4-(cyclohexane)bis(methylamine), tetramethylene diamine and other diamines of the general formula $NH_2(CH_2)_nNH_2$ where $n$ is an integer of value from 3 to 10.

Generally it is preferred that the polyamides of this invention be comprised of a single specific aliphatic dicarboxylic acid such as adipic, pimelic or suberic acid and the diamine is one of those 3,3'-(alkyleneoxy)bis(propylamines) previously described.

The polyamide forming reaction may be carried out in any conventional manner, for example, by heating the reagents in the absence of air or oxygen under conditions which permit the removal of water and/or other by-products, at least during the latter stages of the heating period. Reduced pressure may be used to facilitate the removal of water or other by-products, and a stream of an oxygen-free gas, for example, nitrogen, may be passed through or over the reaction mass.

If desired, some or all of the ingredients may be used in the form of amide-forming derivatives, for example, anhydrides, acid halides and esters of the acids and also the preformed salts of the acids with the diamines. Preferably, the ingredients are used in the form of the preformed salts therefrom, since these salts are easily obtained in pure form and since they contain the ingredients in essentially equimolar proportions.

The various methods of preparing polyamides are well known in the art as well as a number of polymers which contain ether linkages in the polymer chain. These, however, are basically fiber-forming polyamides and therefore not contemplated by the present invention. Examples of some of these prior art methods of making polyamides as well as polyamides containing ether linkages are Canadian Pat. No. 527,223. U.S. Pat. No. 3,509,106, U.S. Pat. No. 3,341,573, U.S. Pat. No. 2,939,862, British Pat. No. 615,954, British Pat. No. 574,713, British Pat. No. 733,002, British Pat. No. 562,370, U.S. Pat. No. 2,558,031, U.S. Pat. No. 3,527,860, Canadian Pat. No. 836,069, and British Pat. No. 487,734.

The polyamides and copolyamides of this application have particular utility in the paper-using industry as hot-melt adhesives which will dissolve in aqueous or a caustic aqueous solution. In many operations using paper products, it is advantageous to use a hot-melt adhesive for various sealing or fastening operations as, for example, in making paper bags or in book binding. Such operations produce a significant amount of scrap paper which can be recovered by repulping and adding this pulp back in the paper-making process. Conventional hot-melt adhesives are not affected by the hot alkaline solutions used in repulping and seriously interfere with successful recovery of paper scrap.

The present invention, however, provides hot-melt adhesives which are dissolved by hot aqueous solutions, and, therefore, do not interfere with the repulping process. Many other uses exist for such a water-soluble hot-melt adhesive.

The polyamides of this invention suitable for use as sizing material and having use in the paper-using industry must and do have melting points which are suitable for their intended use. When such polymers, however, are kept in the molten form, that is, at a temperature of from about 10°–15°C. above their melting point, for any length of time they sometimes undergo further polymerization. It is, therefore, sometimes difficult to maintain uniform inherent viscosities or molecular weight of these polyamides under these conditions since, in the particular sample being kept above its melt point for any length of time, the polymers have a tendency to undergo further polymerization. The polymers being thus formed have a higher molecular weight and a higher melt viscosity which renders them unsuitable for the particular use intended. Therefore, as long as the polyamide contains terminal amide-forming groups, it is not completely satisfactory for the contemplated use as a hot melt paper adhesive when kept in the molten state for any extended length of time. One well-known method of preventing this undesirable occurrence is to add a small amount of a monofunctional amide-forming compound or chain terminator. This addition renders the polymers stable against further polymerization and consequent appreciable change in viscosity when melted, i.e., viscosity stable, by being treated with one or more monofunctional amideforming compounds. By a "monofunctional amide-forming compound" or "chain terminator" it is meant a compound which contains a single amide-forming group. Typical amide-forming groups are —COOH and —NH$_2$. Accordingly, the polyamides of this invention may be improved by the interaction of, treating the polyamides with, or forming them in the presence of, one or more monofunctional amide-forming compounds or substances which yield such compounds under the condition of the treatment for polymerization, the amount of monofunctional amide-forming compounds used not exceeding 5 mole percent of the diamine represented in the polyamide.

Monobasic organic acids of their amide-forming derivatives and monofunctional nitrogenous bases containing at least one hydrogen atom attached to the nitrogen are suitable. The nitrogenous bases include ammonia, monoamines (i.e., compounds containing a single amide-forming amino group) and compounds which will yield either ammonia or monoamines. Examples of the specific compounds are monofunctional acids such as acetic, propionic, stearic, or benzoic acid, anhydrides of monofunctional acids; esters of monofunctional acids, particularly aryl esters such as phenyl and cresyl acetate, phenyl propionate; salts of monofunctional acids with nitrogenous bases such as ammonium butyrate, ammonium stearate, dibutyl ammonium acetate, pentamethylene diammonium acetate, hexamethylene diammonium acetate and propionate; ammonia and derivatives capable of yielding ammonia, such as urea; salts of ammonia, such as diammonium adipate, diammonium sebacate; acetamides, etc.

These monofunctional chain terminators can be added at any convenient state in the process including the after treatment of preformed polyamides. Ammonia is especially useful in this connection. It may be passed into hot molten amide or a solution thereof, and it forms a product of good stability. Another preferred chain terminator would be acetic acid or the anhydride thereof. The quantity of terminator employed determines the ultimate viscosity of the product. Quantities of terminator from 0.1–5.0 and preferably from 1–3.0 mole percent of the diamine (or the dibasic acid) are usually used.

The above process, as well as a number of chain terminators which can be used, is further disclosed in British Pat. No. 495,790.

In addition, the present polyamides and copolyamides have utility as hot-melt adhesives for paper, cloth, and other substrates. Because of their water-solubility, the polymers of this invention may have many uses not open to ordinary hot-melt adhesives. For example, it is possible to apply a water solution of the polymer to a substrate, allowing the water to evaporate leaving an adherent coating of the polymer on the substrate. At some later time a bond can be formed by application of heat and pressure. Another application of this invention involves water-soluble films which are used for packaging detergents, dry bleach, and such products. With the use of the present polyamides or copolyamides of this invention, it is possible to put package and all in a washing machine whereupon the package disintegrates readily in hot water that is relatively uneffected by moisture at ordinary room temperatures. Films of the present water-soluble polyamides have such properties and are useful for this application.

Various additives may also be incorporated into the sizing composition to achieve specific results. Examples of such additives include titanium dioxide, dyes, other pigments and stabilizers such an antioxidants, etc.

Whenever the term "inherent viscosity" (I.V.) is used in this description, it will be understood to refer to viscosity determinations made at 25°C. using 0.5 gram of polymer per 100 ml. of a solvent composed of 60% phenol and 40% tetrachloroethane as parts by weight. In addition, whenever the term "soluble" is used in this description, it will be understood to refer to the activity of a water, aqueous or caustic aqueous solution on the polymer. The term is specifically intended to cover those situations wherein the solution dissolves and/or disperses the polyamide or copolyamide therein and/or therethrough. Furthermore, whenever the word "water" is used in this description, it includes not only aqueous solutions but also hot aqueous solutions and caustic aqueous solutions.

The following examples are included for a better understanding of this invention.

EXAMPLE 1

This example illustrates the preparation of a polyamide of adipic acid and 3,3'-(diethylenetrioxy)bis(propylamine). Into a 250 ml. round bottom flask is placed 29.2 g. (0.20 mole) of adipic acid, 44.2 g. (0.20 mole) of the diamine, and 10 ml. of water. The mixture is stirred under nitrogen at 150°C. metal bath temperature and water distilled from the reaction mixture. After 1 hour, the bath temperature is raised to 200°C., held there for 30 minutes, and then raised to 225°C., where it is held for 1 hour. Cooling of the mixture under nitrogen gives a yellow opaque solid of inherent viscosity of 0.46. Melt viscosity in a Brookfield Viscometer is measured as 4050 cp. at 160°C. A thin film spread from the melt onto 1.5 mil Mylar [poly(ethylene terephthalate)] film is nonblocking at 2 seconds or less. The polymer at 1% by weight in room temperature water gives a clear solution.

EXAMPLE 2

This example illustrates that use of a lower homologue diamine does not produce a water-soluble material. A polyamide is prepared substantially as above using adipic acid and 3,3'-(ethylenedioxy)bis(propylamine) to an I.V. of 0.24. The resulting polyamide is swollen highly in water at 1% by weight but will not dissolve or disperse cold or hot.

EXAMPLE 3

This example illustrates that use of azelaic acid instead of adipic yields a water-insoluble polymer. The polyamide is prepared substantially as in Example 1 using azelaic acid and 3,3'-(diethylenetrioxy)bis(propylamine) to an I.V. of 0.53. The polymer is a nontacky, hazy solid which is not soluble or dispersible at all in hot or cold water at 1% concentration although heating in water produces a highly plasticized mass.

EXAMPLE 4

This example illustrates the use of 3,3'-(triethylenetetraoxy)-bis(propylamine). A polyamide is prepared substantially as in the previous examples using adipic acid and the above-named diamine. The polymer isolated has an I.V. of 0.20 and is soluble at 1% by weight in water, giving a clear solution. The melt viscosity is 172 cp. at 160°C. A thin film spread from a 200°C. melt onto 1.5 mil Mylar film is nonblocking in about 5 seconds or less.

EXAMPLE 5

This example illustrates the preparation of a copolyamide of adipic acid, 4,4-dimethylpimelic acid and 3,3'-(diethylenetrioxy)bis(propylamine). A copolyamide containing 10 mole percent (based on total acid) 4,4-dimethylpimelic acid modifier is prepared as in the preceding examples to an inherent viscosity of 0.52. The melt viscosity of the hard, nontacky polymer is 6550 cp. at 160°C. A thin film spread from a 200°C. melt onto Mylar [poly(ethylene terephthalate)] film is nonblocking in 5 seconds or less. Elongation of the film is ca. 20%. The polymer at 1% by weight in water at room temperature gives a clear solution.

EXAMPLE 6

This example illustrates the preparation of a copolyamide as above except that 1,12-dodecanedioic acid is substituted for the 4,4-dimethylpimelic acid in the same mole proportions (10 mole percent based on total acid). The copolyamide is prepared as in previous examples to an inherent viscosity of 0.50. Melt viscosity of the polymer is 5480 cp./160°C. A thin film spread from a 200°C. melt onto Mylar film is nonblocking in ca. 1 second and shows an elongation of 20% or better. The polymer at 1% by weight in water at room temperature gives a clear solution.

EXAMPLE 7

This example illustrates the preparation of a copolyamide as in Example 5 except that the dimethylpimelic acid is replaced with azelaic acid. A copolyamide is prepared as in the previous examples having a ratio of 75 mole percent adipic acid and 25 mole percent azelaic acid to an inherent viscosity of 0.53. A thin film of the polymer spread from a 200°C. melt onto Mylar film is nonblocking in ca. 20 seconds and shows an initial elongation of 70%. The polymer at 1% by weight in water at room temperature gives a clear solution. A thermogravimetric analysis shows a 2% weight loss at 330°C. indicating good melt stability of the copolymer.

EXAMPLE 8

This example illustrates the melt sizing of continuous filament yarn of poly(ethylene terephthalate) with the compositions of Example 3 and Example 1 above. Two curved tubes, each containing one of the above polymers, are immersed in a 190°C. metal bath and filament filament poly(ethylene terephthalate) yarn passed through the tubes. The yarns are drawn through the molten polymer and then over a heated scraper to remove excess material. The sized yarns in both cases show excellent coating of the bundle, resistance to coating abrasion, and resistance to filament separation. The yarns may be easily desized in a hot water bath.

EXAMPLE 9

This example illustrates the use of a polyamide of this invention as an adhesive for paper. A polyamide of adipic acid and 3,3'-(diethylenetrioxy)bis(propylamine) is prepared to an inherent viscosity of 0.60. The material is then spread, with the aid of release paper, onto 40-lb. Kraft paper in a ⅛ inch wide strip. One-inch wide strips of the paper are cut with the adhesive strip running across the 1 inch dimension and are heat-sealed at 375°F. for 0.2 second on an impulse heat-sealer using heated top and bottom bars to an uncoated strip of 40-lb. Kraft paper. The resultant bonds show a peel strength (under a dead load) of 1,050 g./inch width. The same bonds sealed at 350°F. for 0.2 second show a peel strength of 700 g./inch width.

EXAMPLE 10

This example illustrates the utility of a composition of this invention for a repulpable paper adhesive.

A polyamide is prepared substantially as in the examples above from adipic acid and 3,3'-(diethylenetrioxy)bis(propylamine) using 98 mole percent adipic acid based on total acid and 2 mole percent of a mixture of acetic and stearic acids in a molar ratio of 1:3. The I.V. of the terminated polymer is 0.45. A 3 inches square of fiberboard is creased parallel to the flutes and bonded with the above adhesive. The weight of added adhesive is 3.0% of the weight of the fiberboard. The bonded fiberboard is cut into small squares and placed in a Waring Blender, to which is added 600 ml. of water at 70°C. The mixture is agitated at high speed for 30 seconds and filtered through an 18.5 cm. Buchner funnel with suction. The moist fiber mat, called a "hand sheet," is dried at 177°C. for 20 min. The hand sheet is completely free of dark spots resulting from melting of undissolved or undispersed adhesive. To test humidity resistance, 2 inches wide strips of fiberboard are bonded on a ½ inch overlap and placed in a humidity chamber held at 100°F. and 90% relative humidity. A 100 g. load is hung on the free end of the sample. In 24 hr. there is no delamination of the bond.

Although the invention has been described in considerable detail with particular reference to certain prefered embodiments thereof, variations and modifications may be effected within the spirit and scope of the invention.

We claim:

1. A polyamide consisting essentially of the polymeric condensation product of components (A), (B) and (C) as follows:
    A. a dicarboxylic acid selected from the group consisting of adipic acid, pimelic acid, suberic acid and combinations thereof,
    B. a modifying amount of (1) up to 25 mole percent of a nine carbon atom aliphatic dicarboxylic acid, or (2) up to 15 mole percent of 1,12-dodecanedioic acid, said mole percents being based upon the total amount of dicarboxylic acid; and C. an aliphatic diamine at least 95 mole percent of which is an (alkyleneoxy)bis(propylene) having the formula: $H_2N-C_3H_6-(OR)_n-O-C_3H_6-NH_2$ wherein R is ethylene, 1,2-propylene or 1,3-propylene and n is an integer of 2 to about 13, or combinations thereof, said polyamide having an inherent viscosity of from 0.15 to about 1.0 as measured at 25°C. at a concentration of 0.5 grams of said polyamide per 100 ml. of a solvent consisting of 60 percent by weight phenol and 40 percent by weight tetrachloroethane, said polyamide having a ratio of alkyleneoxy to amide linkages in the range of from at least about 3:2 to about 14:2.

2. Polyamide according to claim 1 wherein the ratio of alkyleneoxy to amide linkages is in the range of from at least about 3:2 to about 5:2, the inherent viscosity is from about 0.25 to about 0.65, and there being none of component (B).

3. Polyamide according to claim 1 wherein the dicarboxylic acid is adipic acid and the aliphatic diamine component is 3,3'-(diethylenetrioxy)bis(propylamine).

4. Polyamide according to claim 1 wherein the aliphatic diamine is 3,3'-(diethylenetrioxy)bis(propylamine).

5. Polyamide according to claim 1 wherein the aliphatic dicarboxylic acid is adipic acid.

6. Polyamide according to claim 2 wherein the dicarboxylic acid is adipic acid and the aliphatic diamine component is 3,3'-(diethylenetrioxy)bis(propylamine).

7. Polyamide according to claim 2 wherein the aliphatic diamine is 3,3'-(diethylenetrioxy)bis(propylamine).

8. Polyamide according to claim 2 wherein the aliphatic dicarboxylic acid is adipic acid.

* * * * *